United States Patent [19]

Harland

[11] Patent Number: 4,706,242
[45] Date of Patent: Nov. 10, 1987

[54] DIGITAL TELECOMMUNICATION SYSTEM

[75] Inventor: Geoffrey Harland, Barnston, Great Britain

[73] Assignee: STC plc, London, England

[21] Appl. No.: 835,219

[22] Filed: Mar. 3, 1986

[30] Foreign Application Priority Data

Mar. 28, 1985 [GB] United Kingdom ............... 8508174

[51] Int. Cl.$^4$ ........................................... H04Q 11/04
[52] U.S. Cl. .................................................... 370/60
[58] Field of Search ........................ 370/58, 60, 66, 94

[56] References Cited

U.S. PATENT DOCUMENTS

| | | | |
|---|---|---|---|
| 4,456,989 | 6/1984 | Johnson et al. | 370/60 |
| 4,539,676 | 9/1985 | Lucas | 370/60 |
| 4,556,972 | 12/1985 | Chan et al. | 370/60 |

Primary Examiner—Robert L. Griffin
Assistant Examiner—Wellington Chin
Attorney, Agent, or Firm—Lee, Smith & Zickert

[57] ABSTRACT

A telecommunication system is structured on a multiplane basis, having an information transfer plane (3), and one or more other planes (4, 5). When a call is set up an initial connection is made via the first plane (3) in packet switched manner. If other services such as voice are needed, connections between the user's terminals are set up on a circuit-switched basis, under control of the connections already set up in the information transfer plane. These additional connections are only maintained as long as needed.

Note that whereas connections are set up in packet manner in the information transfer plane, they are set up in circuit switched manner in the or each other plane.

2 Claims, 3 Drawing Figures

4,706,242

DIGITAL TELECOMMUNICATION SYSTEM

FIELD OF THE INVENTION

The present invention relates to an automatic telecommunication system which is at least partially digital.

BACKGROUND OF THE INVENTION

Recent years have seen the evolution of ideas for using the telephone network, as it is increasingly digitalised, as the basis for a worldwide Integrated Services Digital Network (ISDN). This has taken place pragmatically, as many different interests have been brought to bear on the problems. The result is a set of emerging recommendations which do not necessarily hang together rationally. These recommendations and their implementation in practical networks, will undergo further evolution before the ISDN concept achieves stability.

Where a telecommunication system has to provide more than one type of service, it is known to provide two or more different switching networks. Thus in British Patent Specification No. 1122924 (International Standard Electic Corporation) a system is described which handles both telephone and telegraph traffic. A first switching network with its own control means, and a second switching network also with its own control means, are provided. There is a further control means associated with both networks and serving the subscriber lines. The further control means co-operates with both the other control means as and when needed.

Another known arrangement is in British Patent Specification No. 1363329 (International Standard Electric Corporation). There an exchange serves subscribers some with video-phone equipment. A first switching network handles non-video calls and a second switching network handles video connections, the same control equipment being used for both networks. When a wanted number is received, the control equipment checks to see if both subscribers have video equipment, and if so sets up the call via the second network. If one or both subscribers does not have video equipment the call is set up via the first network.

Also of interest are British Patent Specifications No. 1363433 (Standard Telephones and Cables Ltd.), No. 1351497 (Licentia), No. 1344001 (Western Electric), No. 1297565 (Western Electric, No. 1108003 (Western Electric) and British Published Application No. 2132446A (Standard Telephones and Cables Ltd.)

SUMMARY OF THE INVENTION

An object of this invention is to implement a solution to the problems indicated above.

According to the invention there is provided an automatic telecommunication system, which includes a first switching network to which the system subscriber's terminals have access and one or more other switching networks, wherein the or each said other network provides one or more services different from that provided by the first network, the or each said other network being accessible from a number of said terminals, wherein a connection between two of said subscribers' terminals is initially set up in digital packet-switched manner via the first network, via which information is exchanged between the terminals involved in that connection, wherein if a connection set up via the first network needs a service available via the other network or one of the other networks additional connections are set up in circuit-switched manner via the other network or one or more of the other networks as needed for the required service or services, wherein all signalling and control information interchange is effected via the first network, and wherein the connections via the other network or networks are set up and broken down under the control of the first network.

Thus it will be seen that the main distinctions from known systems which use two or more switching networks are that different call setting techniques are used for the different networks, and that all connection establishment is controlled via one said network.

BRIEF DESCRIPTION OF THE DRAWINGS

Embodiments of the invention will now be described with reference to the highly schematic drawings, in which.

GENERAL INTRODUCTION

Figure 1:
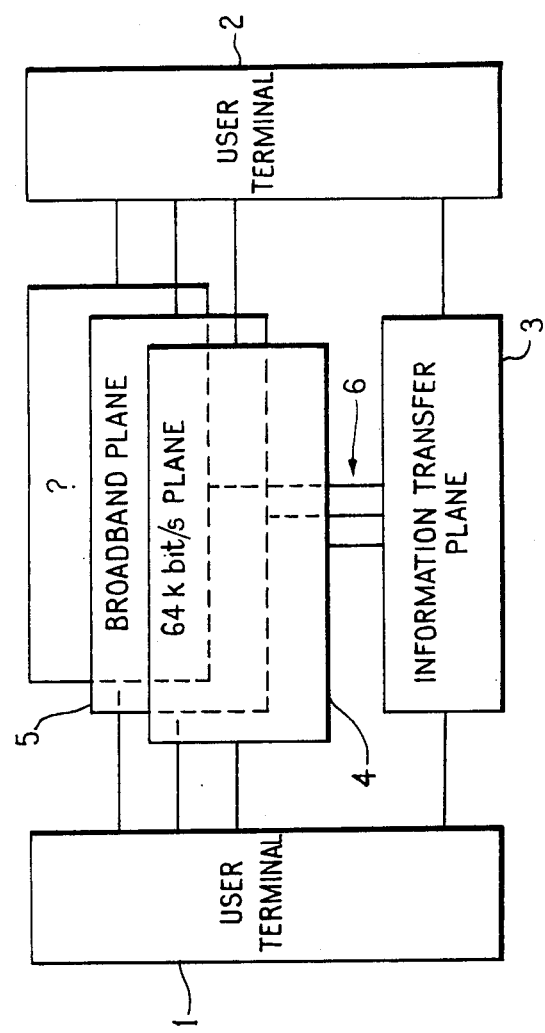
FIG. 1 shows the general arrangement of a system embodying the invention.

Thus the system involves a multi-planar network structure, in which the concept of a multi-service call is applied. A packet-switched virtual call is set up through an information transfer plane, the first network, for handling signalling messages, and this when necessary, forms the basis of every call. Circuit-switched paths, e.g. voice or video, are set up as required, in appropriate network planes (e.g. 64 kbit/s or wideband), under control of the virtual call.

The ISDN was originally seen as a 64 kbit/s circuit-switched multi-service network, based on the emerging integrated (switching and transmission) digital telephone network (IDN). The possibility of using the subscriber access signalling channel for alarms and telemetry was considered, but was seen as merely a shared use of the pair of wires from subscriber's premises to the local exchange and having little to do with the network as a whole. If interworking with a packet-switched data network (PSDN) was considered, it was simply as a transparent access via a 64 kbit/s switched or semi-permanent connection, as the public switched telephone network (PSTN) and analogue leased lines are currently used for PSTN access.

As ISDN concepts have evolved, the handling of packeted data has become an increasingly important integral part of the network. The subscriber line signalling channel (D-channel) is now seen as a packeted-data link, which carries user to network signalling messages and user data packets. ISDN exchanges are increasingly seen as having a packet switching component, if only to provide concentrated traffic access onto dedicated packet networks. In some cases, the packet switched exchanges are regarded as forming one plane of a multi-plane ISDN. Broadband switching is then seen as a further plane.

A recent trend is to use end-to-end signalling, both to handle certain signalling messages in the ISDN User Part and the Telephone User Part (TUP) more expediously and for transferring limited quantities of ISDN user data, i.e. for user-to-user signalling. This can also be used to enable the Signalling System to handle non-circuit-related messages. The recently specified Operations and Maintenance Application Part (OMAP) will make much use of this. The provision of user supplementary services could also require non-circuit-related message handling capability.

The need for end-to-end signalling in Signalling System No. 7 (and particularly for a non-circuit-related message handling capability) has resulted in the specification of a Signalling Connection Control Part (SCCP). This enhances the Message Transfer Part (MTP) to provide the ISO (International Standards Organisation) Network Service for Data Communications. Both connection-oriented service (i.e. virtual circuit service) and datagram type service are provided.

Concurrently with the definition of the SCCP, CCITT Recommendation X.25 has been updated, such that future Packet Switched Data Networks (PSDN) will provide the ISO Network Service. Thus two planes of the evolving ISDN, the signalling and packet switched planes, will support the ISO Network Service.

Some countries (notably the USA) favour separate signalling networks, in which the common channel signalling links are not directly associated with the speech circuits. This has several interesting features. Thus it is favourable to the provision of customer services which require interrogation of a central data base, using non-circuit-related signalling messages. Look-ahead operation, in which the called line state is interrogated before expensive trunk circuits are taken into use, comes more naturally to a separate signalling network. Such a separate network is effectively a packet switched data network, used for a specialised purpose. In a large telephone network, it may have a substantial capacity, comparable to that of the PSDNs which have been installed up to the present time.

The widespread nature of the telephone network (with large numbers of small exchanges), plus the need for high network reliability, means that many common channel links have very low loadings, which may be desirable to minimise signalling message queueing delays, but it also uses plant inefficiently. A separate signalling network may help, by allowing greater concentration of signalling traffic onto fewer signalling link routes, but the basic shortcoming remains, since small local exchanges may only justify a single traffic route. More efficient loadings can only be achieved if signalling message traffic can share the transmission medium with other similar traffic, preferably packeted data.

This leads to the concept of handling signalling and data traffic on a common PSDN, which improves plant utilisation, whilst keeping queueing delays under control, since larger circuit groups can be operated at higher loadings than single or paired links, for the same delay performance. If necessary, signalling traffic may be 'protected' by giving it a higher priority than other traffic.

Public networks have hitherto provided little in the way of supplementary services. Thus, the mode of operation has been strongly orientated towards the setting up of simple, individual calls. Even the thinking on ISDN has been more concerned with the network aspects of setting up service independent (transparent) connections, than with service integration. Once the ISDN is available, it seems likely that users will wish not only to be able to set up (say) a voice call or a facsimile call but also to be able to add on a facsimile connection during some part of a voice call. This is one simple example of the sort of feature which will be necessary. The present ISDN concepts leave this largely as an end system function, supplemented by a rather 'blinkered' voice/data 'swap' capability in the network.

DESCRIPTION OF PREFERRED EMBODIMENTS

FIG. 1 shows schematically the general arrangement of the system embodying the invention. User terminals, 1, 2, whether simple telephones or multi-service terminals, are connected to one or more network planes, preferably via some form of multiplex line. Every user terminal is connected, as a minimum, to an information transfer plane (ITP) 3. Terminals may be connected to other planes such as a 64 kbit/s plane 4 and a broadband plane 5, according to their service needs.

64 Kbit/s and broadband planes 4 and 5 are shown but other planes are possible. For example, a plane providing multiples of 384 kbit/s is a possible evolution from the present 64 kbit/s IDN, for wideband services such as visual telephony. With the exception of the ITP 3 the planes indicated are circuit switched digital or analogue sub-networks similar to those which already exist or are, to a greater or lesser degree, planned.

ITP 3 is the base for the system. It provides, at least, packet switched virtual circuit connection capability between all user terminals. It may also provide, for example, a datagram service. Additionally, it supports control (signalling) links into the other network planes, as shown by the connection 6. It will be seen that the ITP has much in common with existing packet switched data networks (PSDN) and common channel signalling (CCS) networks.

OPERATION

Every call or transaction commences with the establishment of a virtual circuit connection between users, via the ITP 3. If a packet switched data service is all that is needed, the operation goes no further, apart from eventual release of the virtual circuit.

If telephony service is required, the virtual circuit is used to provide a limited information exchange between user terminals. This includes at least status information on the users' telephony facility, and could also include user identities. If the called user's telephony facility is free, the ITP 3 provides the signalling capability needed to establish a circuit switched connection through the 64 kbit/s plane 4 to handle voice transmission. The control of this operation is via the connection 6. The called user is alerted by any suitable calling device. Release of the 64 kbit/s connection is also under control of the ITP 3.

If, during a telephone call, the users need to interchange textual information, this is done via the ITP 3 virtual circuit using, for instance, teletex protocols. Digital facsimile might also be handled via the ITP path. Alternatively, a second 64 kbit/s circuit switched connection might be set up via the same plane 4, or even another plane, under ITP control, for high speed facsimile or slow scan TV transmission. The second connection is only held for the duration of the required information exchange.

If face-to-face communication and/or discussion of sketches produced during the conversation is required, then a 2 Mbit/s or, possibly, a broadband connection via plane 5 could be established under ITP control, for the period necessary.

Thus the system uses a multi-service call, which uses an ITP virtual circuit connection as a common basis, and takes into use other network facilities only as and when required.

Although a particular usage of the supplementary planes has been described, this is not fundamental to the concept. For instance, in the future, the ITP may be used to carry packeted voice and the circuit switched plane(s) may be used only for broadband services. The multi-service call concept would still apply. Broadband connections would be set up under control of the ITP as and when required in support of, say, a telephone call.

NETWORK BENEFITS

Existing networks use forward parallel set up, in which connections are set up link by link from the originating exchange to the called line. If congestion is experienced at any point or if the called line is busy or unavailable, the links already taken into use must be released, having been occupied unnecessarily for, perhaps, hundreds of milliseconds. The system described herein does not take any circuit switched resources into use until the status of the called party has been established. The virtual circuit connection in the ITP is set up link by link, as is normal PSDN practice, but transmission resources are only used during the actual conveyance of information packets.

Not only are circuit switched resources only taken into use when actually needed but circuit switched paths can be selected in the most efficient manner. For instance, since the connection requirement is known at both ends, an ends-to-middle path selection strategy can be used, for high circuit utilisation efficiency. If desired, a full overall path choice approach can be applied, using the ITP to convey and correlate route status information. In this respect our British Patent No. 1529276 (G. Harland 5) is of interest.

USER ASPECTS

For the user, the main benefit is the ability to easily take into use additional network resources without having to pay for transmission capacity which, most of the time, is not needed. Such a capability could be provided with existing and planned networks by suitable terminal design (i.e. an 'intelligent' terminal) but this would be at the expense of greater signalling loads and ineffective loading of circuit switched networks. Set up delays for the supplementary paths are also likely to be higher than for the proposed arrangement.

Figure 2:
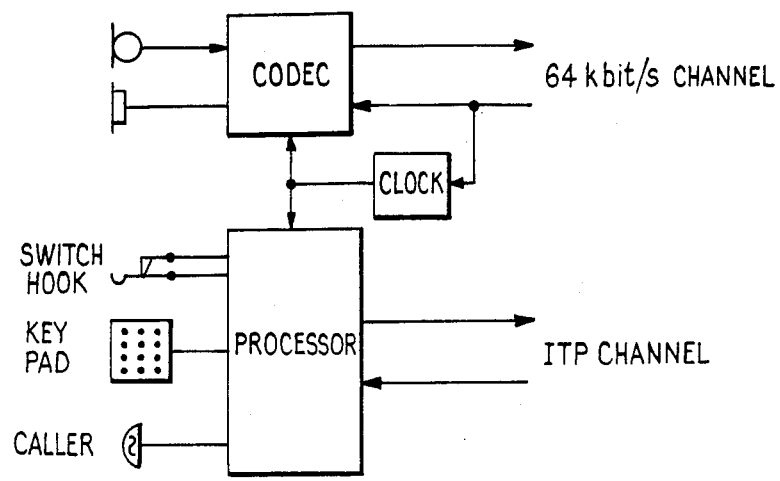
FIG. 2 shows a simple telephony terminal for use in a system such as that of FIG. 1.

The user of, say, telephony service need not be aware of the network mechanisms used to establish his conversation. Thus, for example, a simple telephone might be operated as at present; the 64 kbit/s connection being established automatically once status checks are complete. FIG. 2 shows a block diagram of a simple terminal suited to this purpose.

Here we see a Processor with access to an ITP channel to the plane 3, FIG. 1, with the subscriber's switch hook, key pad and tone caller connected to it. For speech, the microphone and earpiece are connected to a Codec with access to a 64 Kbit/sec. channel to the plane 4, FIG. 1.

Figure 3:
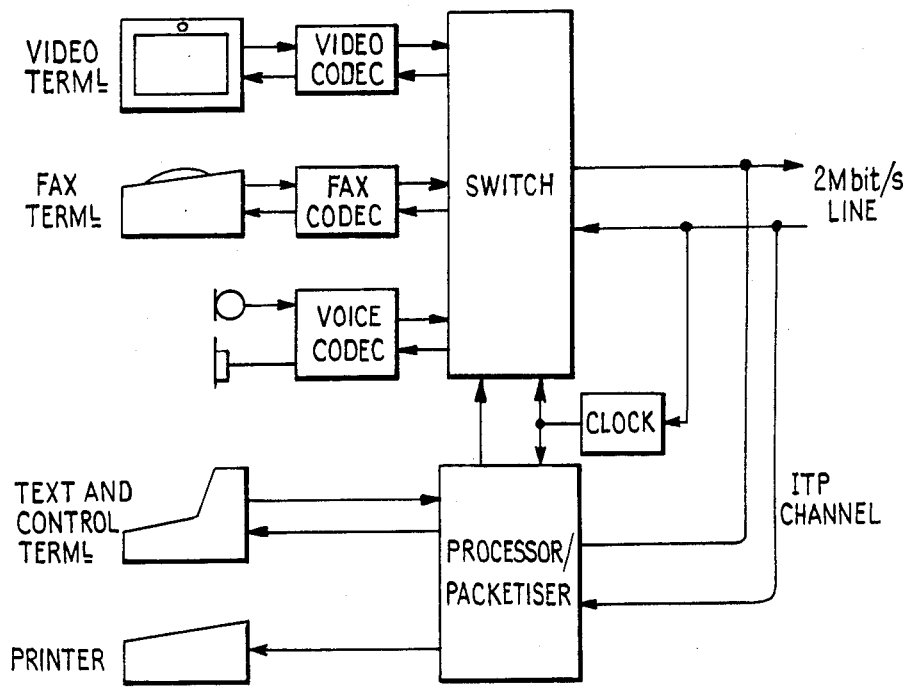
FIG. 3 shows a multi-service terminal, also for use in a system such as that of FIG. 1.

However, an advantageous mode of operation is for the calling user to be presented with a display of the called user's identity, as a check on dialling and routing and to indicate any diversion in force. The status of the called user's terminal can also be displayed, to indicate whether the telephony facility is busy, free or 'user out of the room' and whether say viewphone, teletex and/or facsimile capability is available. The called user's telephone would not be 'rung' until the caller presses a 'telephony' button. Other buttons would introduce the additional features, as required. FIG. 3 is a block diagram of a multi-service terminal using this mode of operation.

In this terminal, several services, video, speech and FAX are connected via respective codecs to a switch which has access to a 2 Mb/s line. In addition, a text and control terminal and a printer are connected via a processor/packetiser to an ITP channel, which in this case is one channel of the channels available on the 2 Mbit/sec. line.

Note that the exchange of identity and status information referred to above can take place regardless of the existence of prior connections. Several virtual calls can terminate simultaneously on a user terminal and, for instance, a record of unsuccessful telephone call attempts can easily be provided for later display to the called user.

At the calling end also, the ability to establish several simultaneous virtual calls is useful. Thus, use of the ITP for, say, computer access, need not preclude the simultaneous establishment of a telephone connection.

CHARGING

Charging is becoming more complex than the simple bulk metering of intervals of elapsed conversational time. Modern call logging systems not only provide itemised billing of normal calls but also the imposition of additional charges for supplementary services, and, when needed, charging for non-conversational time, including ineffective calls. The introduction of an ISDN may further complicate charging, since non-voice services and packet-mode usage are likely to create their own special demands.

A satisfactory implementation of these requirements falls naturally to the present method of network operation. Since the ITP is responsible for all signalling and for control of all connections through other planes, as well as for the handling of packeted data, it has available within itself all the information likely to be needed for charging. Charges may conveniently be imposed, as required, for virtual circuit set-up and user data transfer in the ITP and for each set-up and utilisation of connections in other planes.

CONCLUSIONS

An ISDN structure and mode of operation such as described above represents a rational and inventive extrapolation from where we are today. By means of a multi-plane network architecture, using the concept of a multi-service call, it should satisfy future user needs for a multi-service network. It should also satisfy the network provider's requirements for efficient network utilisation, charging flexibility and an ability to evolve in whichever direction the future takes us.

I claim:
1. An automatic telecommunication system which includes:
   a number of subscriber's terminals served by the system;
   a first switching network to which said subscriber's terminals have access; and
   one or more further switching networks each of which provides services different from that provided by the first switching network, each of said one or more further switching networks being accessible from at least some of the subscriber's terminals;

wherein a connection between two of said subscriber's terminals is initially set up under control of control means associated with the first switching network, said connection being set up in digital packet-switched manner via said first switching network, information relating to said connection being interchanged between the connected subscriber's terminals via said first switching network;

wherein if said connection set up via the first switching network needs a service available via one of said one or more further switching networks, the subscriber's terminals involved in said connection are provided a further connection via said one of said one or more further switching networks in circuit-switched manner;

wherein for the establishment of said further connection via said one of said one or more further switching networks, all signalling and control information exchange is effected via said first switching network, so that the control means of said first switch network is involved in each said further connection set up via said one of said one or more further switching networks, the further conection via said one of said one or more further switching networks being set up in parallel with the connection set up via the first switching network;

and wherein each said further connection set up via said one of said one or more further switching network or networks is set up or broken down under the control of the first switching network and said control means, each said further connection set up via said one of said one or more further switching networks being only retained in use as long as that network's service is needed for said connection.

2. A system as claimed in claim 1, wherein the first switching network is a plural stage network such that each said connection set up via said first switching network involves the use of a plurality of interstage links, wherein connections in the said first switching network are set up on a link-by-link basis, commencing from the calling end, and wherein connections via the one or more further switching networks are set up on an end-marked basis.

* * * * *